United States Patent [19]

Rhodes

[11] 4,052,186
[45] Oct. 4, 1977

[54] METHOD AND APPARATUS FOR CONDITIONING MOLTEN GLASS

[75] Inventor: William Jackson Rhodes, Prescot, England

[73] Assignee: Pilkington Brothers Limited, St. Helens, England

[21] Appl. No.: 733,005

[22] Filed: Oct. 15, 1976

Related U.S. Application Data

[63] Continuation of Ser. No. 653,826, Jan. 30, 1976, abandoned.

[30] Foreign Application Priority Data

Jan. 31, 1975  United Kingdom ............... 4359/75

[51] Int. Cl.² .............................................. C03B 5/22
[52] U.S. Cl. ........................................ 65/137; 65/178;
65/337; 65/346
[58] Field of Search ................. 65/136, 137, 178, 337,
65/338, 339, 341, 346, 347, 356

[56] References Cited

U.S. PATENT DOCUMENTS

| 1,595,861 | 8/1926 | Diederichs | 65/337 |
| 1,641,898 | 9/1927 | Neenan | 65/337 |
| 2,061,367 | 11/1936 | Morton | 65/337 X |
| 3,321,288 | 5/1967 | Griem, Jr. | 65/346 X |
| 3,457,059 | 7/1969 | Boettner | 65/347 X |
| 3,640,517 | 2/1972 | Sendt | 65/347 X |

*Primary Examiner*—Arthur D. Kellogg
*Attorney, Agent, or Firm*—Burns, Doane, Swecker & Mathis

[57] ABSTRACT

Molten glass is conditioned to achieve a desired thermal distribution suitable for feeding the glass to a forming process. The molten glass is fed to the inlet end of a conditioning zone of a tank and glass flow through the conditioning zone is established in a direction towards a remote outlet from that zone with substantially no return flow. The glass is selectively cooled adjacent the inlet to the conditioning zone to achieve a desired temperature profile through the depth and width of a transverse cross section adjacent the conditioning zone inlet so that on flowing through that zone the further conditioning completes transformation of the glass to a state suitable for feeding to the forming process. The cooling is effected at a position selected in dependence on the temperature distribution within the glass and the required temperature profile by passing cooling fluid through at least one fluid cooled pipe immersed in the molten glass located in the forward flowing body of the glass.

27 Claims, 6 Drawing Figures

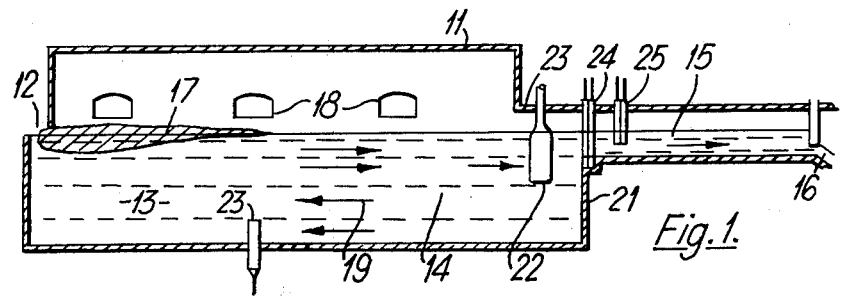
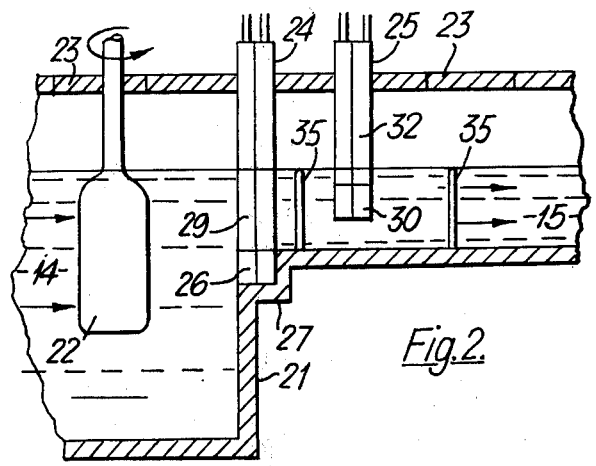

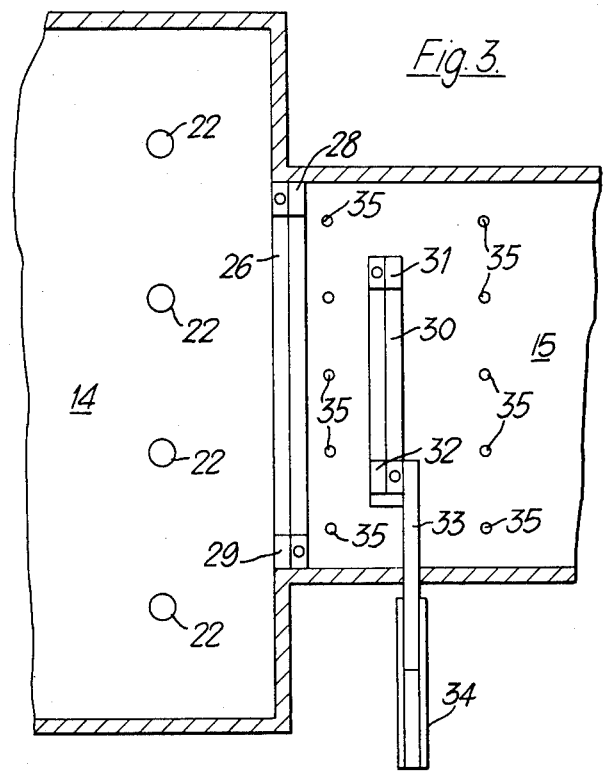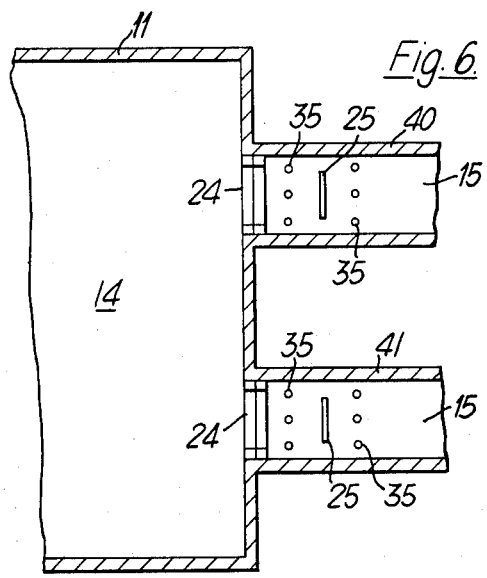

METHOD AND APPARATUS FOR CONDITIONING MOLTEN GLASS

This is a continuation, of application Ser. No. 653,826, filed Jan. 30, 1976 now abandoned.

BACKGROUND OF THE INVENTION

The invention relates to the manufacture of glass and in particular to a method of conditioning molten glass and a glass melting tank for carrying out such conditioning.

In a known method of manufacturing glass in a continuous process, raw materials are fed in at one end of a glass melting tank to form a blanket floating on an existing bath of molten glass. The rate of feeding is sufficient to maintain a constant glass depth in the tank whilst molten glass progressively flows towards the opposite end of the tank known as the working end, from which molten glass is taken away for use in a forming process. The blanket of raw materials is converted to molten glass as it passes through a melting zone at one end of the tank by heat which may come for example from burning fuel supplied from burners situated at spaced intervals in the side walls above the glass level or from electrical heating devices. The molten glass passes from the melting zone into a refining zone where heat is also applied above the molten glass. In the refining zone bubbles of gas still remaining in the glass are encouraged to escape or go into solution in the glass. The glass passes from the refining zone into a conditioning zone adjacent the working end of the tank. In the conditioning zone the glass is homogenised and brought to a suitable thermal condition for use in the forming process. Normally a canal leads from the working end of the tank to a forming process.

From the above, it can be seen that certain regions of the tank are defined as melting, refining and conditioning zones. As regards the molten glass passing from one zone to another, all the glass leaving any one zone may not necessarily have reached a final state for that operation e.g. a fully refined state as it enters the conditioning zone. Some refining can still occur in the conditioning zone, and conditioning may start to some extent in the refining region. Hence the zoned regions are defined to show the areas in which the greater part or all of a particular operation is carried out in a tank, and enables the man practised in the art to identify the temperature conditions required in these zones.

Conventionally flat glass melting tanks are designed to contain a large body of molten glass and are normally of substantially uniform depth throughout the melting, refining and conditioning zones. Convective flow currents set up within the molten glass aid in mixing the glass to achieve homogeneity of temperature and composition. At the same time colder return flows of glass which occur in the lower regions of the tank from the conditioning zone back towards the melting zone protect the refractories at the bottom of the tank from the wear which might otherwise occur if subjected to the higher glass temperatures used in the melting and refining zones.

The above process for the manufacture of glass is however wasteful of heating energy since the returning colder glass in the lower layers of the tank must be reheated each time it passes back through the glass tank. It has been found that the amount of glass which circulates and returns from the conditioning zone to the melting zone is dependent on the depth of the molten glass as well as the temperature gradient between the two ends of the tank and the output from the tank. It is possible to choose the conditions so that all the glass flows in a downstream direction towards the outlet end with no return flow. There are however difficulties in achieving satisfactory homogeneity of temperature and composition if the flow within the tank is entirely in one direction with no return flow. Furthermore, in the conditioning zone it is necessary to lower the temperature of the glass but any excessive surface cooling in the conditioning zone is likely to cause unacceptable inhomogeneity in the molten glass. Furthermore, it is desirable to avoid an excessively long conditioning zone.

Conditioning as a process can vary from achieving substantial thermal and physical homogeneity in glass when it leaves the conditioning zone to achieving a particular temperature gradient in the glass. Conventional methods of achieving a suitably conditioned glass are normally based on supplying cooling air to the surface of the glass as it flows to a forming process. However as the unit output and hence throughout of glass is increased, using conventional air cooling system it has been necessary to increase the size of the conditioning area and provide more accurate control so as to avoid causing steep temperature gradients in the glass due to using large volumes of cooling air on the glass surface. There have been other proposals for removing heat from the bottom of the conditioning zone by use of cooling air and in some cases cooling pipes have been positioned in the glass for the removal of unwanted heat from the glass. However these previous proposals have not involved selective removal of heat from within the body of the glass adjacent the inlet of the conditioning zone to achieve a controlled temperature profile through the glass.

It is an object of the present invention to provide an improved method and apparatus for conditioning molten glass and achieving a desired temperature profile through the glass while all the glass flows in one direction.

SUMMARY OF THE INVENTION

The present invention provides a method of conditioning molten glass to achieve a desired thermal distribution in the glass suitable for feeding to a forming process, which method comprises feeding molten glass through a conditioning zone in a container adapted to contain molten glass, causing all the glass flowing through the zone to flow in a direction from an inlet to the zone towards an outlet from the zone, selectively cooling the molten glass at or near the inlet to the conditioning zone to achieve a desired temperature profile through a transverse cross-section of the glass adjacent the inlet end such that on flowing through the remainder of the conditioning zone the further conditioning completes the transformation of the glass to a state suitable for feeding to a forming process, said cooling being effected by passing cooling fluid through means located in the forward flowing body of the glass.

Preferably the means through which cooling fluid is passed is located in the forward flowing body of the molten glass at a position selected in dependence on the temperature distribution within the glass and the required temperature profile.

The cooling fluid may be passed through a plurality of fluid cooled stirrers and preferably the cooling fluid comprises water.

Cooling fluid may alternatively or additionally be passed through one or more pipes located in the glass.

The cooling at or near the inlet to the conditioning zone may be carried out upstream or downstream of the inlet to the conditioning zone.

When cooling by the use of pipes the said cooling may comprise cooling the lower part of the molten glass by one or more fluid cooled pipes located within the molten glass and extending across the base of the inlet to the conditioning zone and further cooling the molten glass at or near the inlet to the conditioning zone by at least one fluid cooled pipe located in the forward flowing body of molten glass between the upper and lower boundaries of the molten glass.

Preferably the method includes detecting the temperature distribution within the molten glass at or near the entrance to the conditioning zone and positioning at least one of the fluid cooled pipes in dependence on the detected temperature distribution.

The temperature distribution downstream of the cooling means may be also monitored to check on the correctness of the positioning of the cooling means.

Preferably cooling liquid is circulated within the fluid cooled pipes.

The molten glass may also be treated by homogenising means at or near the inlet to the conditioning zone. The method may include the controlled application of heat or cooling to the molten glass in the conditioning zone.

The upper surface of the molten glass in the conditioning zone may be cooled by use of cooling blasts of air.

In the aforesaid method of manufacturing molten glass within a glass melting tank, the depth of molten glass in the refining zone may be greater than the depth of glass within the conditioning zone whereby some recirculation of the molten glass occurs in the refining zone.

The invention also provides a glass melting tank comprising an elongated tank for containing molten glass, said tank having a melting region into which glass forming material is fed, means for heating and thereby melting the contents of the tank in the melting region, a refining region downstream of the melting region in which the molten glass if refined, and a conditioning region having an inlet adjacent the refining region and an outlet at a working end of the tank from which the molten glass is removed, the conditioning region being shallower than the refining region whereby all the molten glass flowing through the conditioning region may flow in a downstream direction towards the working end, and cooling means for cooling the glass in the conditioning region, the cooling means comprising at least one fluid cooled pipe extending across the base of the inlet to the conditioning region and at least one additional fluid cooled pipe at or near the inlet to the conditioning region and located in the body of forward flowing glass at an adjustable position so as to achieve a desired temperature profile at or near the inlet to the conditioning region.

The or each said additional fluid cooled pipe is preferably located in the body of forward flowing glass above the lower boundary of the molten glass and below the upper boundary of the molten glass.

Preferably one or more temperature detectors is provided for detecting the temperature distribution within the molten glass at or near the inlet to the conditioning zone, so that the position of at least one of the fluid cooled pipes may be selected in dependence on the detected temperature distribution. The temperature detectors may comprise an array of thermocouples or other temperature detectors.

Preferably the fluid cooled pipe at the base of the inlet to the conditioning zone is located at the top of a step in the base of the tank, the step being at the junction of the refining and conditioning zones. Preferably the pipe has upstanding side arms which extend up opposite side walls of the tank adjacent to the inlet to the conditioning zone. Preferably the pipe is substantially U-shaped. The height of the pipe may be adjustable.

The additional fluid cooled pipe may be located in the conditioning zone downstream of the inlet. Alternatively the additional cooling means may be located within the refining zone immediately upstream of the inlet to the conditioning zone. In some cases it may be desirable to provide further cooling means both upstream and downstream of the inlet to the conditioning zone.

Preferably the or each additional fluid cooled pipe is also adjustable in height and preferably comprises a U-shaped water cooled pipe.

The glass melting tank may also incorporate one or more stirrers, preferably water cooled. Such stirrers may be located upstream, at, or downstream of the inlet to the conditioning zone.

Preferably the fluid cooled pipe extending across the base of the inlet to the conditioning region extends transverse to the length of the tank and extends across the entire width of the tank. The additional fluid cooled pipe or pipes may on the other hand extend only part way across the width of the tank and be located centrally across the width.

The invention also provides a glass melting tank comprising an elongated tank for containing molten glass, said tank having a melting region into which glass forming material is fed, means for heating and thereby melting the contents of the tank in the melting region, a refining region downstream of the melting region in which the molten glass is refined, and a conditioning region having an inlet adjacent the refining region and an outlet at a working end of the tank from which the molten glass is removed, the conditioning region being shallower than the refining region whereby all the molten glass flowing through the conditioning region may flow in a downstream direction towards the working end, and cooling means for cooling the glass on passing from the refining region to the working end, said cooling means comprising a plurality of fluid cooled stirrers located in the body of forward flowing glass and at least one fluid cooled pipe located in the body of molten glass in the conditioning region arranged to achieve a desired temperature profile in the molten glass.

By selective use of the fluid cooled pipe or pipes and/or stirrers it is possible to achieve satisfactory cooling of the molten glass in the conditioning zone and a desired temperature profile while all the glass flows in one direction without the need for an excessively long conditioning zone. By adjusting the exact height and location of at least one fluid cooled pipe it is possible to achieve optimum temperature profile conditions within the conditioning zone.

As is already known, any inhomogeneity in the conditioning zone tends to form into thin horizontal layers in the molten glass each having a slightly different composition from the immediately adjacent layer. Generally the layers are so thin and the differences of composition are so small that provided the layers remain substantially parallel to the major surfaces in the final glass product, no adverse affect is observed. If however these layers are caused to deviate from the parallel condition, optical faults in the glass may result. By use of the present invention, it is possible to reduce the likelihood of such faults occuring.

BRIEF DESCRIPTION OF THE DRAWINGS

FIG. 1 is a side elevation of a glass melting tank in accordance with the invention, FIG. 2 is an enlarged view of part of the tank shown in FIG. 1, FIG. 3 is a plan view of the part of the tank shown in FIG. 2.

FIG. 6 shows a plan view an alternative to the arrangement shown in FIG. 3.

DESCRIPTION OF THE PREFERRED EMBODIMENT

Figure 4:
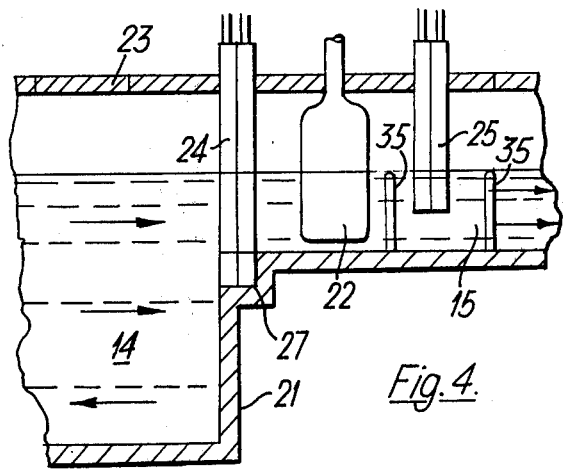
FIG. 4 is a view similar to FIG. 2 showing an alternative embodiment.

FIG. 1 shows a glass melting tank 11 having a filling end 12 into which is fed raw material for glass manufacture. The raw materials float on the previously melted glass in the form of a blanket 17. The blanket melts progressively in a melting zone 13 adjacent the filling end of the tank. The molten glass passes progressively in a downstream direction through a refining zone 14 to a conditioning zone 15 adjacent the working end of the tank. An outlet 16 is provided at the working end from which the glass is removed for use in a subsequent forming process. Gas or oil heating devices are located along the sides of the body of the tank downstream of the filling end 12 for heating the molten glass via heating ports 18. Waste gases pass through regenerator ports in the sides of the furnace, the regenerator ports leading to a furnace chimney.

In the refining zone 14, the molten glass circulates with the glass in the upper layers flowing in a downstream direction while the glass nearer the bottom of the tank forms a return flow marked by the arrows 19 leading back towards the filling end of the tank. In the refining zone undissolved gases are released to the atmosphere. In the conditioning zone 15 the glass is conditioned so as to achieve the desired thermal condition and composition homogeneity ready for the subsequent glass forming process.

In each of the zones in the tank, it is possible to achieve some circulation of the glass with a return flow towards the filling end of the tank. The amount of return flow, if any, is dependent on the depth of the molten glass in the zone, the output from the tank, and also the temperature gradient between the beginning and end of the zone. In the examples shown, the melting zone 13 and the refining zone 14 are the deepest zones in the tank and the base of the tank has an upward step 21 at the junction of the refining and conditioning zones so that the conditioning zone is substantially shallower than the melting and refining zones. The conditions in the refining zone are such that a degree of return flow 19 occurs. Substantially all the glass flow in the conditioning zone is away from the filling end of the tank, the depth of glass being selected to achieve this condition.

Although the return or re-circulating flow in the melting and refining zones of the tank improves homogeneity, glass quality is not necessarily sufficiently improved, particularly at high outputs from the tank. To improve this, in this embodiment of the invention, stirrers 22 are introduced through the roof 23 of the furnace immediately upstream of the inlet to the conditioning zone. The stirrers are arranged to act on the forward flow of glass only and cause attenuation of the glass layers without substantial disturbance from their normal horizontal state. As can be seen from FIG. 3, the refining zone 14 is of greater width than the conditioning zone 15 and four stirrers are arranged side-by-side in a row extending transversely across the width of the refining zone of the tank. Adjacent stirrers are arranged to rotate in opposite directions. The stirrers are preferably formed from hollow tubes through which cooling water is circulated to remove heat more rapidly from the body of glass flowing forwards at the downstream end of the refining zone and at the same time equalising the temperature distribution across the width of the tank at the entrance to the conditioning zone 15.

To achieve cooling in the conditioning zone 15, surface cooling occurs by directing cooling air towards the surface of the molten glass. In addition, means for achieving additional selective cooling are provided in the form of water cooled pipes 24 and 25 located adjacent the inlet to the conditioning zone 15. The pipe 24 comprises a straight horizontal section 26 extending across the full width of the conditioning zone transverse to its length and the section 26 is located in a rectangular recess 27 formed in the top of the step 21. The pipe 24 has two upstanding side arms 28 and 29 which extend vertically up opposite side walls of the tank. In this way the pipe 24 is of rectangular U-shape. The pipe has an inlet at the top of the arm 28 and an outlet at the top of the arm 29, the inlet and outlet are connected through the roof of the tank to a circuit in which cooling water is circulated. By locating the pipe 24 immediately adjacent the inlet to the conditioning zone, the pipe removes some heat from the lower regions of the glass entering the conditioning zone and furthermore protects the refractory corners of the step 21 from erosion by the accelerating glass passing from the refining to the conditioning zone. In order to remove additional heat from the body of the glass in the conditioning zone and achieve a desired temperature profile, a second water cooled pipe 25 is located adjacent the inlet to the conditioning zone immediately downstream of the pipe 24. The pipe 25 is also of rectangular U-shape having a base section 30 and two upstanding side arms 31 and 32 providing inlet and outlet passages for cooling water. The pipe 25 is arranged so that the horizontal section 30 is located in the body of the glass between the upper and lower boundaries of the molten glass in the conditioning zone. The width of the pipe 25 is approximately half the width of the conditioning zone. The pipe 25 is adjustable in position both vertically and transversely and as shown in the drawings the pipe is located substantially centrally across the width of the zone, with the section 30 substantially mid-way between the upper and lower boundaries of the molten glass. To allow the adjustability in position, the pipe 25 is fixed to a mounting arm 33 which extends to one side of the tank and adjustably engages a support member 34. The arm 33 can be moved both vertically and transverse to the length of the tank, on the support member 34. The tank also has an array of thermocouples 35 near the inlet to the conditioning zone. The thermocouples 35 are all transversely aligned and are spaced across the base of the tank. The thermocouples are mounted in refractory sheaths closed at the top, each sheath contains a number of thermocouples at varying heights so as to ensure adequate monitoring throughout the glass depth. By projecting into the molten glass the thermocouples measure the temperature distribution within the molten glass. The position of the pipe 25 is adjusted in dependence on the measured temperature distribution within the glass so that the cooling effected by the water pipes in the conditioning zone causes the glass to have a desired temperature profile at or near the entrance to the conditioning zone. This temperature profile is selected such that the further conditioning which occurs as the glass flows along the conditioning zone results in the molten glass having the desired temperature conditions for the subsequent forming process on leaving the conditioning zone through the outlet 16.

It has been found that cooling the glass adjacent the bottom of the conditioning zone improves the glass stability in the upper layers in the conditioning zone and reduces the likelihood of glass from the upper surfaces flowing downwards towards the bottom of the conditioning zone. By locating the additional pipe 25 in the hotter area of glass within the conditioning zone it is possible to achieve the desired temperature profile with a more uniform temperature distribution throughout the glass within the conditioning zone. It also allows quicker cooling to be achieved in the conditioning zone as a whole without the disadvantage of unstable flow in the conditioning zone. By extracting the heat at a greater rate, it is possible to use a much shorter conditioning zone.

In this example, both the pipes 24 and 25 are adjustable in height although the pipe 24 is normally located such that the horizontal section 26 is totally within the recess 27. More than one pipe 25 may be provided, and some pipes 25 may be located upstream of the pipe 24 (that is at the end of the refining zone) if necessary. In this case it is necessary to ensure that any pipe 25 located in the refining zone upstream of the pipe 24, is so positioned that it does not substantially enter the return flow and affect that return flow. The position of the pipes 25 is adjustable both to allow optimum operating conditions to be achieved and to cope with changes in conditions during operation. The adjustment in position of the pipes may be made, as previously described, as a result of signals derived from thermocouples immersed in the glass in fixed positions. Alternatively depth temperature surveys in the glass may be carried out by passing thermocouples vertically through the roof of the tank and observing values at fixed increments of depth through the glass. These results can then be used to determine the desired positions for the pipes.

Figure 5:
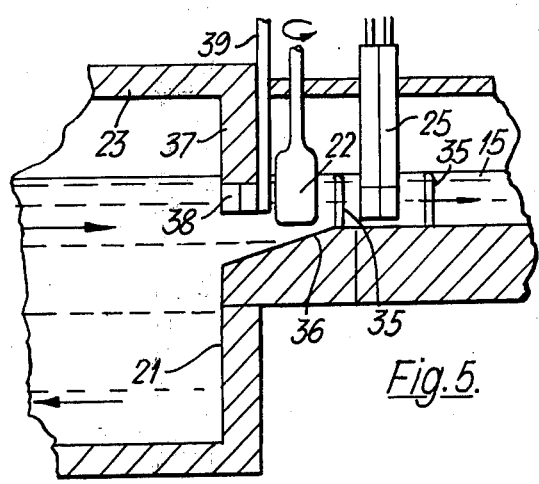
FIG. 5 shows yet a further view similar to FIG. 4 showing a further embodiment.

FIG. 4 shows an alternative arrangement adjacent the junctions of the refining and conditioning zones. Similar numerals have been used for similar parts. In this case the stirrer 22 is removed from the refining zone and located adjacent the inlet to the conditioning zone between the pipe 24 and the pipe 25. FIG. 5 shows a further alternative arrangement adjacent the junctions of the refining and conditioning zones. In this case the step between the two zones has a sloping surface 36 interconnecting the step 21 with the floor of the conditioning zone.

The roof of the refining zone is provided with a downwardly projecting wall 37 which forms a barrier extending down into the molten glass adjacent the junction of the refining and conditioning zones. The lower horizontal edge of the wall 37 is provided with a horizontal cooling pipe 38 through which cooling water circulates via vertical inlet and outlet pipes 39 connected to opposite ends of the pipe 38. In this example the pipe 25 is provided as previously described and the stirrer 22 is located upstream of the pipe 25 as already described with reference to FIG. 4.

In the arrangement shown in FIG. 2, the stirrers 22 may be water cooled although the water pipes 24 and 25 are arranged in dependence on the temperature distribution within the glass and the required temperature profile. However, in an alternative construction to that shown in FIG. 2, one or both of the water cooled pipes 24 and 25 may be omitted. In such an arrangement, the water cooled stirrers 22 are positioned and arranged to produce the desired temperature profile through a transverse cross-section of the glass adjacent the inlet end of the conditioning zone. In such an alternative arrangement where the water cooled stirrers are used to produce the desired temperature profile at the inlet end of the conditioning zone, further cooling in the conditioning zone can be achieved by one or more water pipes extending through the molten glass, the or each water pipe being positioned at any desired location along the length of the conditioning zone and at any desired position between the upper and lower boundaries of the molten glass.

In the arrangement shown in FIG. 3, the refining zone 14 is arranged to feed a single conditioning zone, the conditioning zone being narrower than the refining zone. It is however possible to feed two or more conditioning zones in parallel and one such arrangement is shown in FIG. 6. In this arrangement, two narrow tank portions 40 and 41 extend towards the outlet end of the tank from the main body portion providing the refining zone 14. Each of the narrow channels 40 and 41 provides a separate conditioning zone 15 similar to that previously described with reference to FIG. 1. The depth of molten glass in each of the narrow channels 40 and 41 is arranged so that the glass flow through each of the channels is in the direction of the outlet only. Each channel has a water pipe 24 located at the top of a step 21 at the entrance to the conditioning zone as previously described. A further water cooled pipe 25 is positioned slightly downstream from the pipe 24 and an array of thermocouples 35 are provided both upstream and downstream of the cooling pipe 25. The operation of the modification shown in FIG. 6 is generally the same as that previously described with reference to FIGS. 1, 2 and 3.

The invention is not limited to the details of the foregoing examples. For instance, the tank may have a waist adjacent the junction of the refining and conditioning zones so that the molten glass passes through a narrow region at this junction.

Further, as indicated above in achieving cooling in the conditioning zone, surface cooling is achieved by directing cooling air towards the surface of the molten glass, in some instances additional or alternative cooling or heating means may be required in order to achieve a desired temperature profile within the designed limits of the equipment. One such case is where the form of the invention is such that homogenising and cooling means are provided before the inlet to the conditioning zone, in this case we find it convenient to provide further cooling means at any point along the length of the conditioning zone in the forward flowing molten glass as it passes through the conditioning zone. Such an arrangement may enable the continued use of a relatively short conditioning zone despite an increase in load on the tank. In addition or alternatively burners may be provided in the side walls of the conditioning zone if additional heat is required.

I claim:

1. A method of conditioning molten glass to achieve a desired thermal distribution in the glass suitable for feeding to a forming process, which method comprises feeding molten glass to the inlet end of an elongate conditioning zone in a container adapted to contain molten glass, establishing a flow of the molten glass through the conditioning zone in a direction from the inlet end of the zone towards a remote outlet from the zone at the opposite end thereof, with substantially no return flow, selectively cooling the molten glass adjacent the inlet to the conditioning zone to reduce its temperature and achieve a desired temperature profile through the depth and width of a transverse cross-section of the glass adjacent the conditioning zone inlet such that on flowing through the remainder of the conditioning zone the further conditioning completes the transformation of the glass to a thermal condition suitable for feeding to a forming process, said cooling being effected, at a position selected in dependence on the temperature distribution within the glass and the required temperature profile, by passing cooling fluid through means located in the forward flowing body of the glass, said means, including at least one fluid cooled pipe comprising portions immersed in the molten glass and extending transversely along the bottom of said conditioning zone and upwardly through the depth of said conditioning zone.

2. A method according to claim 1 in which said cooling comprises cooling the lower part of the molten glass by one or more fluid cooled pipes located within the molten glass and extending across the base of the inlet to the conditioning zone and further cooling the molten glass at or near the inlet to the conditioning zone by at least one fluid cooled pipe located in the forward flowing body of molten glass between the upper and lower boundaries of the molten glass.

3. A method according to claim 1 including detecting the temperature distribution within the molten glass at or near the entrance to the conditioning zone and positioning at least one of the fluid cooled pipes in dependence on the detected temperature distribution.

4. A method according to claim 3, including checking the temperature distribution within the molten glass at a position downstream of the cooling means.

5. A method according to claim 1 in which the cooling is effected by circulating cooling water within one or more water pipes.

6. A method according to claim 1 including homogenising the molten glass at or near the inlet to the conditioning zone.

7. A method according to claim 1 wherein said cooling is effected by use of a plurality of fluid cooled stirrers immersed in the molten glass.

8. A method according to claim 7 wherein cooling water is circulated through said stirrers.

9. A method according to claim 1 including directing cooling air at the upper surface of the molten glass in the conditioning zone.

10. A method according to claim 1 including applying heat selectively to the molten glass in the conditioning zone.

11. A method according to claim 10 in which heated gases are derived from burners located in the side walls of the conditioning zone and are directed at the molten glass surface.

12. A glass melting tank comprising an elongated tank for containing molten glass, said tank having a melting region into which glass forming material is fed, means for heating and thereby melting the contents of the tank in the melting region, a refining region downstream of the melting region in which the molten glass is refined, and a conditioning region having an inlet adjacent the refining region and an outlet at a working end of the tank from which the molten glass is removed, the conditioning region being shallower than the refining region whereby all the molten glass flowing through the conditioning region may flow in a downstream direction towards the working end, and cooling means for cooling the glass in the conditioning region, the cooling means comprising at least one fluid cooled pipe extending across the base of the inlet to the conditioning region and at least one additional fluid cooled pipe at or near the inlet to the conditioning region and located in the body of the forward flowing glass at an adjustable position so as to achieve a desired temperature profile at or near the inlet to the conditioning region.

13. A glass melting tank according to claim 12 in which the or each additional fluid cooled pipe is located in the body of forward flowing glass above the lower boundary of the molten glass and below the upper boundary of the molten glass.

14. A glass melting tank according to claim 12 in which one or more temperature detectors is provided for detecting the temperature distribution within the molten glass at or near the inlet to the conditioning zone.

15. A glass melting tank according to claim 14 in which the temperature detectors comprise an array of thermocouples.

16. A glass melting tank according to claim 12 in which the fluid cooled pipe at the base of the inlet to the conditioning zone is located at the top of a step in the base of the tank, the step being provided at the junction of the refining and conditioning zones.

17. A glass molting tank according to claim 16 in which the pipe has upstanding side arms which extend up opposite side walls of the tank adjacent to the inlet to the conditioning region.

18. A glass melting tank according to claim 17 in which the pipe is substantially U-shaped.

19. A glass melting tank according to claim 16 in which the height of the fluid cooled pipe is adjustable.

20. A glass melting tank according to claim 12 in which the or each additional fluid cooled pipe is located in the conditioning zone downstream of the inlet.

21. A glass melting tank according to claim 19 in which the or each additional fluid cooled pipe is provided with means for adjusting the depth of immersion of the pipe within the molten glass.

22. A glass melting tank according to claim 12 including one or more stirrers.

23. A glass melting tank according to claim 22 in which said stirrers are water cooled.

24. A glass melting tank according to claim 22 in which the stirrers are located upstream of the inlet to the conditioning zone.

25. A glass melting tank according to claim 12 in which said fluid cooled pipe extending across the base of the inlet to the conditioning region extends transverse to the length of the tank and extends across the entire width of the tank.

26. A glass melting tank according to claim 25 in which the or each additional fluid cooled pipe extends only part way across the width of the tank and is located centrally across the width.

27. A glass melting tank comprising an elongated tank for containing molten glass, said tank having a melting region into which glass forming material is fed, means for heating and thereby melting the contents of the tank in the melting region, a refining region downstream of the melting region in which the molten glass is refined, and an elongate conditioning region having an inlet adjacent the refining region and an outlet at a working end of the tank from which the molten glass is removed, the conditioning region being shallower than the refining region so that all the molten glass flowing through the conditioning region may flow in a downstream direction towards the working end, and cooling means for cooling the glass adjacent the conditioning zone inlet on passing from the refining region to the working end, said cooling means comprising a plurality of fluid cooled stirrers located in the body of forward flowing glass and at least one fluid cooled pipe immersed in the molten glass and located in the body of molten glass in the conditioning region arranged to achieve a desired temperature profile in the molten glass, said fluid cooled pipe comprising portions extending transversely along the bottom of said conditioning zone and upwardly through the depth of said conditioning zone.

* * * * *